United States Patent Office 3,573,271
Patented Mar. 30, 1971

3,573,271
PROCESS FOR RECOVERING PROTEIN FROM AQUEOUS YEAST LIQUORS
Milo A. Nielsen, St. Paul, Minn., assignor to Emery C. Swanson, Golden Valley, Minn.
No Drawing. Continuation of abandoned application Ser. No. 800,306, Dec. 10, 1968, which is a division of application Ser. No. 565,714, July 18, 1966. This application Apr. 9, 1970, Ser. No. 31,810
Int. Cl. A23j 1/18; C07g 7/00
U.S. Cl. 260—112                                      6 Claims

ABSTRACT OF THE DISCLOSURE

A process for molecular sieve fractionation of protein from brewers yeast or torula yeast liquors using a bed of modified dextran gel granules composed of cross-linked linear macromolecules in a three dimensional network of polysaccharide chains containing pores excluding penetration by said protein molecules.

---

This application is a continuation of United States patent application Ser. No. 800,306, filed Dec. 10, 1968 now abandoned, which is a division of United States patent application Ser. No. 565,714, filed July 18, 1966 now abandoned.

This invention relates to a process for the recovery of protein (for utilization as food, and otherwise) from liquid residues resulting from other manufacturing processes. While millions of people in underdeveloped countries remain underfed and undernourished, millions of pounds of protein and other nutrients in waste residues not only remain unused, but actually are detrimental to plant and animal life when discharged as pollutants.

For example, in the manufacture of cheese from milk only approximately half of the milk solids are coagulated as cheese. The remaining solids, composed principally of lactose, protein and salts, remain in the whey residue. A small fraction of this whey is concentrated and part of the lactose is recovered by crystallization. Some whey is fed as such to farm animals, such as pigs. Some whey is dried for use as cattle feed although the salts present make it relatively unpalatable for human use and, for this reason, it must be mixed with other more palatable substances. Some small amount of whey is used for human food after drying and probably electro-dialysing. The vast majority of whey, however, is simply a waste product whose disposal presents problems of stream pollution and the like. Other similar high protein residues result as a by-product of beer manufacture in the form of brewers yeast and from paper manufacture and other pulping operations in the form of torula yeast, only small proportions of which find utilization and the rest representing a disposal problem. Protein may also be recovered for human food use from pulped leaves of many plants.

Although dextran gel molecular sieve materials have been indicated as useful for separating protein from smaller molecules, such as inorganic salts, it has been recognized that the adsorption of aromatic substances on molecular sieve gels can affect the separation, Advances in Protein Chemistry, vol. 17 (1962), pp. 209–224, and that aromatic substitution has a marked effect on the migration through the gels, Biochimica et Bio Physica Acta, vol. 39 (1960), pp. 193–207. The yeast in aqueous yeast liquors contains 50 to 59 percent of nitrogen compounds, approximately 80 percent of which are nucleoproteins, lecithoproteins, glycoproteins, proteins, peptones and polypeptides with the remaining 20 percent being principally purines, pyrimidines, choline and glucosamise, as reported in the literature, Microbiology, 2nd ed., M. J. Pelczar and R. D. Reid, McGraw-Hill, N.Y. (1965), and Industrial Microbiology, 3rd ed., S. C. Pescott and C. G. Dunn, McGraw-Hill, N.Y. (1959). This is in marked contrast to cheese whey, which contains 13–15 percent nitrogen compounds, approximately 60 percent of which are protein, principally $\beta$-lactoglobulin and $\alpha$-lactalbumin, and essentially none of which is nucleoprotein, see Industrial Microbiology, supra. The lipid compositions in yeast are made up of varying combinations of sterols, phospholipids, and glycerides of fatty acids, whereas all of the lipids in cheese whey are glycerides of fatty acids with only a trace amount of phospholipids, see Fundamentals of Dairy Chemistry, B. H. Webb and A. H. Johnson, AVI Publishing Co., Westport, Conn. (1965); and Milk Proteins, Advanced Protein Chemistry 22, 55, (1967). The nucleic acid content of yeast cells is 6–8 percent ("Chemical Week," Aug. 12, 1969, pp. 41–44 and Biochemistry Handbook, S. Long, 1961), and the soluble (or non-ribosonal) nucleic acid ranges from 10–20 percent of the total nucleic acid in microorganisms (Principles of Biochemistry, A. White et al., 1964, McGraw-Hill, N.Y., pp. 182–183). The insoluble (or ribosonal) nucleic acid in yeast is therefore about 6.4 percent. Since the nucleic acid is 40–50 percent of the dry weight of the ribosonal particles, the remainder can be considered to be protein associated therewith or bound thereto. As a result, the nucleoprotein (i.e. both the ribosonal nucleic acid and the protein) constitutes about 12.8 to 16 percent nucleoprotein in the yeast cell (or 14.4 to 17.6 percent if the soluble nucleic acid is included). In view of the known adsorption of the highly aromatic compounds, such as nucleoproteins and nucleic acids, on dextran gel molecular sieve, it would not appear that such molecular sieve materials could be effectively used for separating the protein from lower molecular weight materials in aqueous yeast liquors, even though such separation is possible for cheese whey.

The present invention is directed to the recovery of protein from liquid waste residues. Broadly stated, the invention comprises passing a protein containing liquid residue through a bed composed of a stable modified dextran gel composed of cross linked linear macromolecules in a three dimensional network of polysaccharide chains containing pores of controlled size which are penetrated by smaller molecules of non-protein materials. In the course of its passage through the gel bed the larger protein molecules pass in the aqueous liquid outside of the gel granules while lower molecular weight non-protein materials are entrapped by the gel.

The protein containing effluent liquid is concentrated by evaporation and then preferably dried, as by spray drying or freeze drying. The resulting dry product, composed predominantly of protein and containing lesser amounts of other nutrients, is palatable and nutritious. It is useful anywhere dry milk solids are used, as in cakes or other bakery products and mixes for the same. The dry product may be mixed with liquids to produce nourishing food concentrates. It may be mixed with liquid and whipped to produce food toppings, frostings and the like.

The dextran gel functions as a molecular sieve. The gel is produced by hydrating a dry insoluble modified dextran powder obtained by cross linking linear macromolecules and consisting of a three dimensional network of polysaccharide chains. The modified dextran is neutral and therefore does not interact with anions and cations. It contains hydroxyl groups and is therefore strongly hydrophilic. It swells in water to form a gel. The gel contains pores, the sizes of which depend on the degree of cross linkage.

The gel when hydrated and swollen is packed into a flat filter bed in a vacuum filter or a cylindrical annular filter bed in a centrifugal filter and can in such a bed separate molecules of different sizes. In a bed filled with the swollen gel, small molecules are able to move in the aqueous liquid which is both within and outside the gel. Using a dextran gel whose approximate limit for complete exclusion is from about 5000 to 10,000 molecular weight, the larger protein molecules cannot penetrate the gel granules but can only move through the bed in the liquid outside the gel granules. These molecules which are larger than the largest pores of the swollen gel (i.e., above the exclusion limit) therefore pass through the bed in the liquid phase and are thus eluted first. The smaller molecules, primarily lactose and salts such as sodium, potassium and calcium phosphates, and perhaps some carbonates, where whey is the liquid residue, penetrate the gel particles. The smaller molecules penetrate the gel particles to a varying extent depending on their size and shape.

As liquid is continued to be passed through the gel bed, in time the smaller molecules are eluted from the bed in the order of decreasing molecular size. For this reason the liquid eluted from the gel bed is desirably recovered in separate fractions in a repeating time cycle, the first fractions (in the case of whey) being liquid containing predominantly protein; the next fractions containing lesser protein and more lactose; the next fractions containing little protein, predominantly lactose and some salts; the succeeding fractions contain progressively smaller amounts of lactose, until the lactose concentration becomes negligible; the latter fractions being the result of washing the gel bed with water after the passage of a given amount of protein containing liquid. The degree of fractionation is dependent to a large extent upon the intended end use of the recovered product.

Washing the gel bed with water after passage of a given amount of protein containing liquid has the effect of regenerating the bed by forcing the smaller molecules through the bed in their order of decreasing molecular size. The cycle is then repeated, first protein liquor and then wash water, alternately over and over again. By use of suitable automatic controls the system is completely automated to introduce protein liquor and wash water alternately on a time cycle basis and to segregate the discharge from the filter into appropriate fractions. The liquid fractions are then concentrated and preferably dried.

The dried product from the first fractions consists predominantly of protein. This is the major and preferred product. Lactose is recovered from other fractions by concentration and crystallization. Other dried products are recovered from whey consisting of a fraction which is predominantly lactose and salts or mixtures of lactose and protein. Where the value of the solids in the later wash fractions warrant the expense of concentration and drying, these products are recovered. Otherwise, they are simply discarded as waste, unless local anti-pollution regulations prohibit this.

Because the later fractions are relatively dilute they do not present a serious pollution problem.

Exemplary dextran gel filter bed materials are available from Pharmacia Fine Chemicals, Inc., under the registered trademark "Sephadex." For separation of protein Sephadex G–25, which has an approximate limit for complete exclusion of about 5000 molecular weight, and Sephadex G–50, which has an approximate limit for complete exclusion of about 10,000 molecular weight, may be used. Dry Sephadex G–25 will take up about 2½ times its weight over a period of hours to form a gel. Sephadex G–50 will take up about 5 times its weight. About 20 kilograms of Sephadex G–25 and 50 liters of water will swell to about 100 liters of gel. About 10 kilograms of Sephadex G–50 and 50 liters of water will swell to about 100 liters of gel.

For convenience the process is described with particular reference to recovery of protein from whey. The processing techniques are generally the same for other protein containing liquid residues but the non-protein constituents vary depending upon the source of the liquor. As an illustration of the process of recovering protein from whey, when 11,000 pounds of milk containing 12% solids is put through the conventional cheese making process, approximately half of the milk solids (or 1,000 pounds) is coagulated as cheese. The remaining whey (in the amount of 10,000 pounds) now contains about six percent solids composed of about one percent protein and five percent lactose.

In accord with common practice, this whey is concentrated by evaporation to about 60 percent solids and then weighs about 1000 pounds. This concentrated whey is then held under refrigerated conditions for several hours and about 300 pounds of lactose is separated by crystallization. The remaining whey molasses in the amount of about 700 pounds is the preferred starting material for the protein recovery process according to the present invention. The whey molasses is a viscous liquid which is about 40 percent solids made up of 100 pounds of protein to 200 pounds of lactose.

The dextran gel bed is prepared by hydrating the dry powder, in which form it is received from the manufacturer, with from about 2½ to 5 times its weight in water, depending upon the particular gel used. Hydration normally occurs over a period of at least six hours. The whey molasses is ordinarily passed through the gel bed in a series of successive batches although continuous operation is possible. For batch operation the gel bed is made up of a maximum of 2 times the weight of dry powder compared to the weight of each whey batch.

According to one form of the invention, a basket centrifuge is lined with Vyon filter material, which is a form of porous polyethylene, to retain the gel. The gel is introduced into the centrifuge head which is spun to distribute the gel material and establish an annular cylindrical bed. The centrifuge is operated at about 60 G (750 r.p.m.) until the gel filter cake is formed. Then the speed is increased to about 1000 G (3000 r.p.m.) and the centrifuge is operated at this speed for about 15 minutes to spin out any excess water.

A batch of whey molasses, strained to remove any large size pieces of residual casein, is added to the centrifuge basket slowly. Even dispersion of the liquor batch throughout the filter cake is achieved by using a suitable applicator device. The centrifuge is operated at about 750 r.p.m. during the batch addition and this same speed is continued for about 5–10 minutes additional to allow the batch to equilibrate within the filter cake. Effluent may or may not be collected during the equilibration period.

At the end of the equilibration period the centrifuge speed is increased to 1000 G, which speed is maintained for about 10–15 minutes. During this time the effluent containing the large sized protein molecules is collected, most of the effluent being obtained during the first five minutes of operation at high speed. The speed is again reduced to about 750 r.p.m. and the filter cake is washed with water.

During the early stages of washing the small molecules from the liquor batch are eluted. These are composed primarily of lactose, salts, etc. About 10 to 12 volumes of water are ordinarily used for washing the bed for each volume of whey molasses passed through it. When the effluent is clear the washing is stopped and the speed is increased to about 3000 r.p.m. to expel the excess water from the filter cake. The cycle is now complete and the filter cake is ready to receive another batch of whey molasses. The initial effluent is first concentrated to about 30 to 40 percent solids and then preferably dried, as by spray drying. The resulting product, in the amount of about 100 pounds from the starting 700 pounds of whey molasses, is composed principally of protein (70 to 90%) and also contains some lactose and salts.

If a higher degree of purity of protein is desired than that obtained by one pass through the dextran gel bed, the initial protein containing effluent can be passed through the filter a second time and the resulting effluent will be higher in protein content and lower in lactose and salt content. By this means a powder containing up to about 95% protein has been obtained. In the event of such a second pass, the batch size may be increased by about one-third since the lactose content of the sample is then considerably reduced from the original lactose content.

The effluent from the washing cycle is concentrated to more than about 50 percent solids (about the saturation point for lactose) and held cold for several hours to separate lactose by crystallization. About 100 pounds of lactose is recovered from the original 700 pounds of waste whey molasses in this manner. Alternatively, the wash effluent may be subjected to electrodialysis to remove salts and then concentrated and spray dried or crystallized to recover the lactose. The solutions containing residual salts are concentrated and dried where it is economically feasible to do so, either because of a market demand for the product or because of restrictions against discarding the liquid as such.

An alternative to the recovery of protein from whey molasses by centrifugal filtration is the use of vacuum filtration. According to this alternative process a layer of dextran gel to the depth of about two to three centimeters is disposed on a sheet of Vyon filter material, preferably in the form of a moving belt, revolving horizontal disk or drum or plate filter. The whey molasses is sprayed onto the dextran gel layer. About one minute is allowed for equilibration. Then vacuum is applied from below and the protein containing effluent is concentrated and preferably dried as previously described. The filter layer is then sprayed with water. Vacuum is applied from below. The effluent from the wash cycle is collected, preferably as several fractions. The washed and regenerated gel is recycled for repeated use. The lactone is crystallized or dried as previously described and the salts recovered or discarded.

The filtration is preferably carried out at a temperature between about 60 and 100° F. (15 and 38° C.) and desireably at the lower temperature to minimize bacterial activity. The protein containing liquor is preferably introduced to the bed at about the same temperature. The temperature of water used for washing and for regeneration of the dextran gel is not critical. The protein containing liquor for separation should have a viscosity of no more than about 30 centipoise, or a maximum percent solids of about 15%.

For most efficient separation and recovery of protein the dextran gel filter bed is preferably at least about 15 to 20 mm. thick for both centrifugal filtration and flat bed vacuum filtration. The use of thicker beds increases the total volume required, adding cost without increasing efficiency since longer separation and regenerating times are required. In a batch operation the weight of hydrated dextran gel is at least from about 2 to 4 times the weight of the protein containing liquor sample utilized in each successive batch. In a continuous operation, as where separation and recovery takes place through a filter bed, on a moving belt, revolving disk or revolving drum or plate filter, or the like, substantially greater amounts of dextran gel must be provided. However, the amount of filter bed on the belt disk, drum or plate in the time period required for addition of protein liquor will be present in the amount of from at least 2 to 4 times the weight of protein liquor added during the same time period.

While the final product is preferably recovered as a dry powder for convenience in storage, packaging, shipping, etc., for some purposes a concentrated syrup may be desirable. In this instance additives in the form of sugar and/or salt may be added to aid in preservation of the material or other preservatives may be added. Flavoring agents and other additives may be incorporated in the final product as desired.

Although it has been proposed in the past to use dextran gel filtration in laboratory analytical procedures, fractionation of blood serums, molecular weight determinations, and the like, it has never been suggested or proposed that large volume recovery of protein for food use from waste residues is feasible or even possible. It has been demonstrated that the process of the present invention makes feasible the recovery of protein for human use from whey molasses in large quantities in amounts of one million pounds per month of dry powder from a single plant.

The invention is further illustrated by the following specific examples:

EXAMPLE I

The separation of protein from whey molasses in a basket centrifuge is illustrated by the following:

The perforated basket of a centrifuge is first lined with porous polyethylene filter material (Vyon) and then the centrifuge rotor is prepared for separation by adding a slurry of dextran gel (Sephadex G–25) which has first been swollen by soaking in water. The centrifuge is rotated at about 3,000 r.p.m. (about 1,000 G) as the slurry of gel is added to form a bed in the form of a ring around the periphery of the rotor which is free from excess water. The centrifuge is now ready to receive the whey for the separation process.

Whey molasses is diluted to 2:1 with water. This product is sprayed onto the insides of the slowly rotating dextran gel ring and allowed to equilibrate for about five minutes at about 700 to 800 r.p.m. If any effluent should be forced through the filter bed during this low speed equilibration period it is collected. After the equilibration period the speed of the centrifuge is increased to about 3,000 r.p.m. (1,000 G) and the effluent is collected. The first effluent fractions contain mostly protein and little lactose and salts. These fractions are combined and concentrated to about 40% solids and dried.

The high protein fractions are collected over a period of about 10 minutes. After this time the centrifuge speed is decreased to about 700 to 800 r.p.m. (60 G) and washing of the dextran gel cake with water is begun. The concentration of protein in the wash fractions decreases to a very small amount while the concentration of lactose increases to a peak and then, as washing is continued, it too decreases to a very small amount. If there is a portion of the effluent which contains a mixture of lactose and protein in about equal amounts and in concentration sufficient to warrant recovery this fraction may be recycled back through the process to produce other fractions distinct as to composition. The composition and volume of fractions obtained from separation of 400 volumes of 2:1 water-whey molasses mixture and wash water as needed are shown in the table:

| Fraction Number: | Volume collected | Lactose, percent | Protein, percent |
| --- | --- | --- | --- |
| 1A | 148 | 0.26 | 2.93 |
| 1B | 325 | 0.51 | 1.40 |
| 2 | 100 | 0.04 | 0.04 |
| 3 | 100 | 0.35 | 0.08 |
| 4 | 100 | 0.37 | 0.08 |
| 5 | 100 | 1.00 | 0.15 |
| 6 | 100 | 1.60 | |
| 7 | 500 | 2.60 | |
| 8 | 500 | 2.40 | |
| 9 | 500 | 2.00 | |
| 10 | 500 | 1.30 | |

The low speed fraction 1A and high speed fraction 1B were combined, concentrated and dried. Wash fractions 5 through 10 were combined and concentrated sufficiently to enable the lactose to be recovered by crystallization. Wash fractions 2 through 4 are small in size and low in concentration in both lactose and protein so that the cost of recovery would hardly be justified in most instances. These fractions would ordinarily simply be discarded unless anti-pollution regulations would prohibit this. The combined volume of fractions 1A and 1B collected is greater than that of the initial mixture by an amount representing excess water in the dextran gel filter bed.

EXAMPLE II

Whey molasses has been fractionated to separate the protein for recovery in the laboratory using vacuum as follows:

A suction funnel (Büchner) and a vacuum flask were utilized. A disk of Vyon porous polyethylene filter material was placed in the suction funnel and a slurry amounting to about 200 parts by weight of dextran gel (Sephadex G-25) previously swollen by soaking in water was placed on the funnel and vacuum was applied. The vacuum was continued to free the filter cake from most of the excess water. About 100 parts by weight of a whey molasses sample diluted 2:1 with water was placed on top of the filter cake and allowed to soak in for about 2 minutes. Vacuum was then applied and all possible liquid from the sample was collected.

After the first fraction had been collected, washing of the filter cake with water was begun. Wash water was added without application of vacuum, allowed to soak in for about one minute, vacuum was then applied and the wash fraction was collected. Four or five such washes are ordinarily needed to completely remove the lactose and salts from the filter bed to prepare it for reuse. The amounts and composition of the several fractions are shown in the table:

| Fraction Number: | Amount collected | Lactose, percent | Protein percen |
|---|---|---|---|
| 1 | 87 | 0.06 | 1.27 |
| 2 | 103 | 2.4 | 1.98 |
| 3 | 109 | 2.5 | 0.56 |
| 4 | 97 | 0.80 | 0.21 |
| 5 | 162 | 0.02 | 0.06 |

Fraction 1 contains predominantly protein and was concentrated and dried. Fraction 2 contains more nearly equal quantities of both protein and lactose and in amounts sufficient to warrant recycling. Fractions 3 and 4 contain mostly lactose and are concentrated sufficiently to permit the lactose to be separated by crystallization. The last fraction is very low in both protein and lactose indicating that these constituents have been removed from the filter bed, which is now ready to receive another batch of material to be fractionated.

EXAMPLE III

Whether separation is carried out by centrifugation or vacuum the viscosity of the product when it is placed on the filter bed is of utmost importance. The results of an experiment to determine the viscosities of various whey molasses solutions are as follows:

| Sample | Temp. °C. | Viscosity centipoise |
|---|---|---|
| Whey molasses (undiluted) | 40 | 1,240 |
| Whey molasses-water (1:1) | 40 | 39 |
| Whey molasses-water (1:2) | 40 | 25 |

The effect of temperature on viscosity of whey molasses solutions was also determined as follows:

| Sample | Temp. °C. | Viscosity centipoise |
|---|---|---|
| Distilled water | 20 | 12 |
| Whey Molasses-water (1:2) | 20 | 26 |
| Whey Molasses-water (1:3) | 20 | 21 |

Since there is virtually nothing to be gained in warming the whey molasses solutions to 40° C., as opposed to working at 20° C., the latter temperature is preferred. The possibility of bacterial activity is less at the lower temperature.

The effect of viscosity on efficient separation was demonstrated by experiments using a basket centrifuge according to the procedure of Example 1 and various dilutions of whey molasses. The filter bed was made up of about 800 parts by weight of dextran gel (Sephadex G-25) and each sample was about 200 parts by weight. The results were as follows:

| Fraction No. | Whey molasses (undiluted) | | Whey molasses-water (1:1) | | Whey molasses water (1:2) | |
|---|---|---|---|---|---|---|
| | Protein, Percent | Lactose, Percent | Protein, Percent | Lactose, Percent | Protein, Percent | Lactose, Percent |
| 1 | 5.39 | 7.2 | 3.96 | 5.0 | 3.45 | 0.30 |
| 2 | 1.05 | 1.1 | 1.2 | 0.6 | 0.70 | 0.20 |
| 3 | 1.27 | 1.5 | 0.71 | 0.9 | 0.61 | 1.0 |
| 4 | 1.15 | 2.0 | 0.55 | 1.1 | 0.29 | 0.30 |
| 5 | 0.76 | 1.6 | 0.35 | 1.4 | 0.20 | 0.60 |
| 6 | 0.63 | 1.9 | 0.25 | 1.1 | 0.30 | 1.60 |
| 7 | | | 2.0 | | 0.9 | 0.30 |
| 8 | | | 1.2 | | 0.4 | 0.10 |
| 9 | | | 0.45 | | 0.05 | 0.22 |

It will be seen that good separation of protein from lactose was not achieved until a 1:2 whey molasses-water solution was used indicating that an upper viscosity limit of about 30 centipoise is necessary for efficient separation.

EXAMPLE IV

Brewers yeast solutions have been fractionated using both the centrifugal and vacuum methods. In each instance the filter bed is prepared in the same manner as described for whey molasses. The yeast cells contained in the product as it is obtained from the brewery must be either removed or decreased in size to facilitate their passage through the filter bed. This was accomplished by diluting the brewers yeast solution 1:1 with water and adjusting the pH to 9.0 with sodium hydroxide. This mixture was centrifuged at about 1500 to 2000 r.p.m. for about five minutes to spin down the yeast cells. The supernatant is then decanted and used in the fractionation process. This supernatant product contains about 1.3% protein.

For either the centrifugal or vacuum method, the sample to be fractionated may be up to one half of the volume of the gel bed, in this instance Sephadex G-25. The yeast supernatant is applied to the filter bed and the fractions are collected in the same manner as whey molasses. The analysis of fractions of undiluted brewers yeast fractionated in a suction funnel using 30 volumes of yeast supernatant and 100 volumes of gel bed, followed by washing with water, is as follows:

| Fraction Number | Volume collected | Protein, Percent | Description |
|---|---|---|---|
| 1 | 33 | 0 | Fairly clear, no odor. |
| 2 | 50 | 0.29 | Beer odor, darkest. |
| 3 | 40 | 0.13 | Slight beer odor, lighter than 2. |
| 4 | 80 | 0.06 | Very slight odor lighter than 3. |

No attempt has been made to analyze other components of the effluent. The higher protein containing fractions are concentrated and dried. The resulting dry product is relatively free from the characteristic bitter taste of dried whole brewers yeast.

EXAMPLE V

Torula yeast has also been separated by both the centrifugal and vacuum methods. The sample was prepared by adjusting the pH of a 10% solution of torula yeast to 10.0 with 10% sodium hydroxide. The resulting suspension was centrifuged at about 1,500 to 2,000 r.p.m. for five minutes. The protein content of the centrifugal supernatants increases with pH. At pH 10.0 the supernatant protein content of a 10% solution is about 1.7%. The fractionation procedures and results are generally the same as for brewers yeast and the resulting protein fractions when concentrated and dried produce a product free from objectionable flavors.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A process for the recovery of useful food protein from protein-containing aqueous brewers yeast or torula yeast liquor comprises:
    (A) introducing said liquid into a bed of compacted modified dextran gel granules composed of crosslinked linear macromolecules in a three dimensional network of polysaccharide chains containing pores excluding penetration by molecules of said protein,
    (B) entrapping smaller molecules having molecular weights less than said protein in the pores of said gel,
    (C) forcing larger protein molecules through said bed in the aqueous liquid outside the gel granules,
    (D) eluting said protein molecules from said bed, and
    (E) concentrating the protein solution.

2. A process according to claim 1 further characterized in that said protein solution is concentrated to about 30 to 60 percent solids and dried.

3. A process according to claim 1 further characterized in that
    (A) said dextran gel bed, after elution of said protein molecules, is washed with water to wash out said entrapped smaller molecules in order of decreasing molecular weight,
    (B) collecting the effluent from said washing in a plurality of fractions in order of decreasing molecular weight of the solute therein, and
    (C) concentrating at least part of said fractional solutions to recover the solute therein.

4. A process according to claim 3 further characterized in that
    (A) protein containing liquor and wash water are introduced alternately and repeatedly to said dextran bed,
    (B) the effluent from said bed from successive introductions of protein containing liquor is combined and the fractional effluent solutions from successive introductions of water are separately combined, and
    (C) said dextran bed is repeatedly reused to effect separation and recovery of protein from said liquor.

5. A process according to claim 1 further characterized in that said protein molecules in said liquor are forced through said gel bed by centrifugation.

6. A process according to claim 1 further characterized in that said protein molecules in said liquor are forced through said gel bed by vacuum applied to the discharge side of said bed.

References Cited

UNITED STATES PATENTS 3,002,823  10/1961  Flodin et al. _____ 23—293

OTHER REFERENCES

Biochimica et Biophysica Acta, vol. 39, 1960, pp. 193-207, Porath.

Technical Data Sheet No. 9, Pharmacia.

Sephadex—"Gel Filtration in Theory and Practice"—Pharmacia, pp. 1–10, 12 and 34–37, April 1965.

Advances in Protein Chemistry, vol. 17, 1962, pp. 209-224, Porath.

HAROLD D. ANDERSON, Primary Examiner

H. SCHAIN, Assistant Examiner

U.S. Cl. X.R.

99—2, 17, 97, 116; 127—31; 260—120